(12) United States Patent
Bailey et al.

(10) Patent No.: US 8,157,515 B2
(45) Date of Patent: Apr. 17, 2012

(54) SPLIT DOUBLET POWER NOZZLE AND RELATED METHOD

(75) Inventors: Mark Bailey, Simpsonville, SC (US); Christopher E. Thompson, Danvers, MA (US)

(73) Assignee: General Electric Company, Schenectady, NY (US)

( * ) Notice: Subject to any disclaimer, the term of this patent is extended or adjusted under 35 U.S.C. 154(b) by 929 days.

(21) Appl. No.: 12/222,091

(22) Filed: Aug. 1, 2008

(65) Prior Publication Data

US 2010/0028143 A1    Feb. 4, 2010

(51) Int. Cl.
*F03B 1/04* (2006.01)
*B23P 19/04* (2006.01)

(52) U.S. Cl. .................. 415/202; 415/209.1; 415/209.4

(58) Field of Classification Search ............... 415/209.1, 415/209.4, 202; 29/402.3
See application file for complete search history.

(56) References Cited

U.S. PATENT DOCUMENTS

| | | | |
|---|---|---|---|
| 6,099,245 A | 8/2000 | Bunker | |
| 7,008,178 B2 | 3/2006 | Busch et al. | |
| 7,329,096 B2 | 2/2008 | Tomko et al. | |
| 7,334,306 B2 | 2/2008 | Beverley et al. | |
| 7,341,427 B2 | 3/2008 | Farmer et al. | |
| 7,470,109 B2 | 12/2008 | Tomko et al. | |
| 2005/0254944 A1* | 11/2005 | Bash et al. ................. | 415/209.4 |

* cited by examiner

*Primary Examiner* — David S Blum
(74) *Attorney, Agent, or Firm* — Nixon & Vanderhye, P.C.

(57) ABSTRACT

A vane doublet for a turbine nozzle includes a radially inner band; a radially outer band; and a pair of airfoils extending between the inner band and the outer band. One of the inner and outer bands is split in a generally axial direction along a split line passing between the pair of airfoils, and a seal is secured between or adjacent to facing edges of the split line.

14 Claims, 4 Drawing Sheets

SPLIT DOUBLET POWER NOZZLE AND RELATED METHOD

This invention relates generally to gas turbine technology, and more specifically, to the manufacture or repair of turbine nozzles.

BACKGROUND OF THE INVENTION

Turbine nozzles are commonly cast as vane doublets, i.e., arcuate segments with two vanes or airfoils per segment, in order to lower the cost of the casting. The doublet configuration, however, leads to high stress/strain in certain areas of the doublet, which can manifest itself in the form of cracks. Once cracks grow to a critical size, the component part must be removed from service and repaired to prevent it from failing catastrophically in the turbine.

In more modern designs of gas turbine nozzles, a common approach is to use a singlet configuration, i.e., one airfoil per segment, rather than the doublet configuration. The use of a singlet configuration eliminates much of the stress/strain that drives cracking in the doublet configuration, but typically, singlets are considerably more expensive to produce.

BRIEF DESCRIPTION OF THE INVENTION

In an exemplary, but nonlimiting embodiment of the present invention, an otherwise conventional vane doublet turbine nozzle is modified to behave more like a singlet nozzle by splitting one or the other of the inner and outer bands (i.e., sidewalls) of the doublet.

Accordingly, in one aspect, the present invention relates to a vane doublet for a turbine nozzle comprising: a radially inner band; a radially outer band; and a pair of airfoils extending between the inner band and the outer band, wherein one of the inner and outer bands is split in a generally axial direction, along a split line passing between the pair of airfoils; and wherein a seal is secured between or adjacent to facing edges of the split line.

In another aspect, the present invention relates to a method of repairing a turbine nozzle doublet vane to reduce occurrence of cracking and extend service intervals wherein the doublet vane comprises inner and outer bands with a pair of airfoils extending therebetween, the method comprising: a) removing the doublet vane from the turbine nozzle assembly; and b) splitting one of the inner band and the outer band from a leading end to a trailing end, between the pair of airfoils and securing a seal between or adjacent to facing edges of the split line.

The invention will now be described in connection with the drawings identified below.

DETAILED DESCRIPTION OF THE INVENTION

Figure 1:
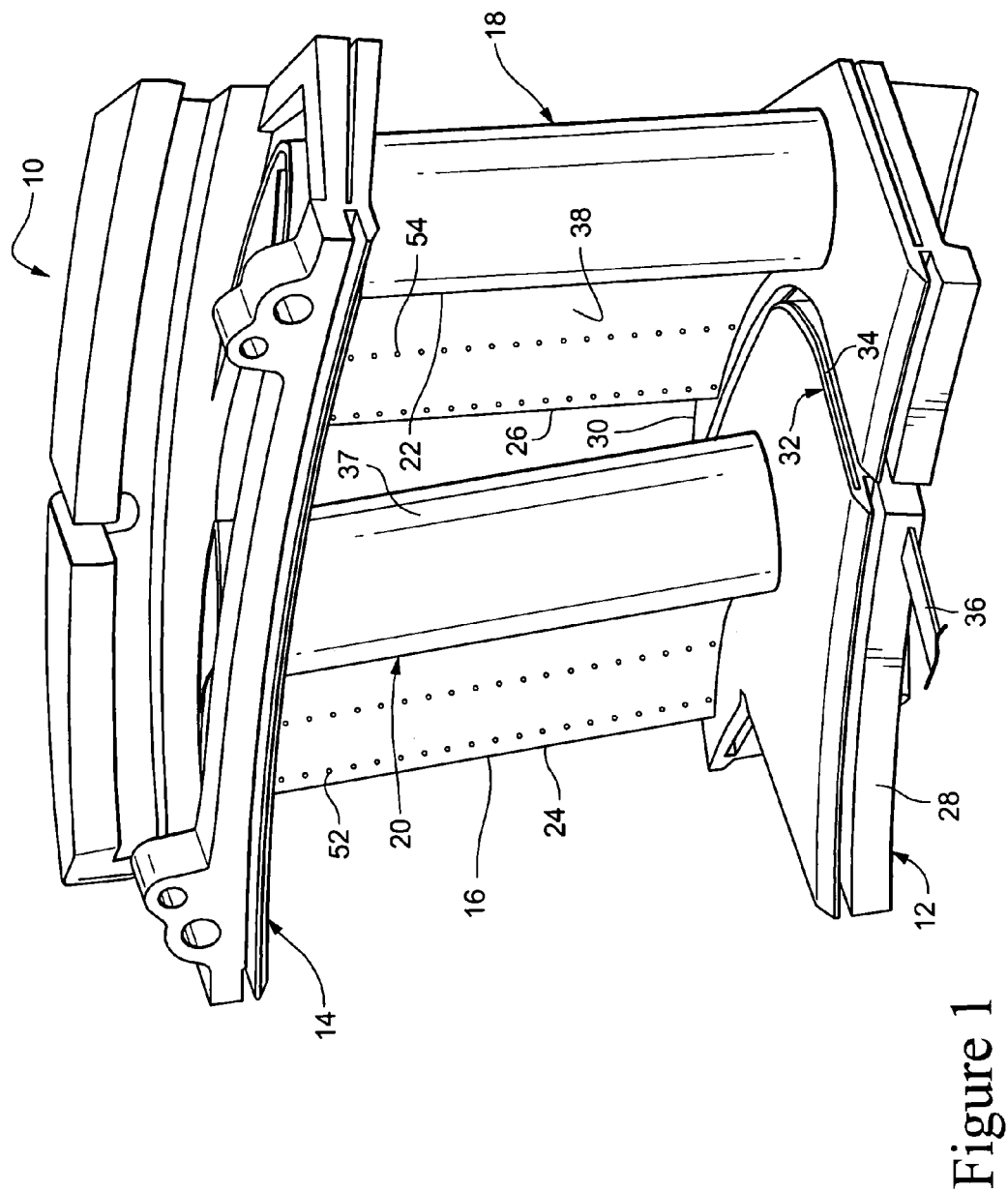
FIG. 1 is a perspective view of a turbine nozzle doublet in accordance with an exemplary but nonlimiting embodiment of the invention.
Figure 2:
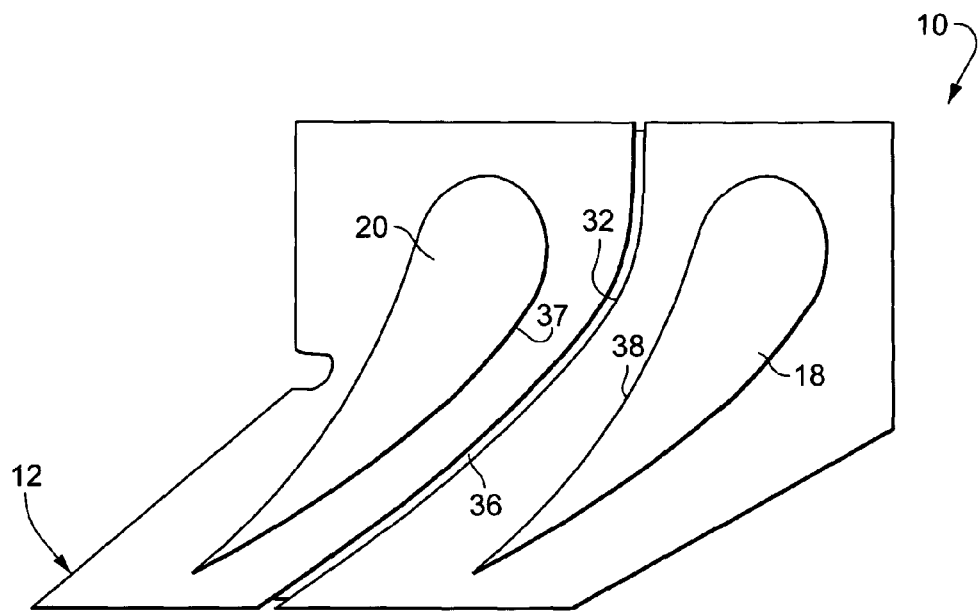
FIG. 2 is a schematic bottom plan view of the doublet shown in FIG. 1.

With reference initially to FIGS. 1 and 2, a doublet nozzle segment (or simply, vane doublet) 10 for a gas turbine nozzle includes a radially inner band or sidewall 12 and a radially outer band or sidewall 14. The nozzle doublet essentially forms one arcuate segment of a plurality of such nozzle doublet segments secured within an annular diaphragm, such that the vanes surround the turbine rotor (not shown), with rows of blades or airfoils on the rotor located on opposite sides of the stationary nozzle in conventional fashion.

In this exemplary embodiment, a pair of vanes or airfoils 16, 18 extend radially between the inner and outer bands 12, 14. The airfoils have respective leading edges 20, 22 and respective trailing edges 24, 26. As oriented in FIG. 1, the nozzle doublet inner band 12 may be considered to have a forward or leading end 28 and an aft or trailing end 30, i.e., the flow of air is in a direction from end 28 to end 30. With this understanding as to orientation, the airfoil 18 may be regarded as the right-hand airfoil, and airfoil 20 as the left-hand airfoil.

The above-described doublet configuration is essentially a four-bar linkage, which in the environment of a gas turbine nozzle, creates undesirably high stresses as mentioned above, particularly in the airfoil 18 on the right hand side of the doublet. In order to alleviate the stress on the airfoil 18, which has a tendency to grow thermally in a radial direction, it has been discovered that the resultant cracking problem can be mitigated by relieving the stress on the airfoil. In the exemplary implementation, this is achieved by splitting the inner band 12 and thus decoupling the four bar linkage. Specifically, a split line 32 is formed which progresses from the leading end 28 to the trailing end 30 between the airfoils 16 and 18. In the configuration exemplary in FIG. 1, where the outer band is secured to a retaining ring that prevents radial expansion of the outer band, the split allows the airfoil 18 to push the inner band inward in a radial direction, as the airfoil expands due to thermal growth. The movement is no more than a few thousandths of an inch, but is sufficient to alleviate the thermally induced stress. In the preferred arrangement, split line 32 follows substantially the curvature of the suction side 37 of airfoil 20 or the pressure side 38 of the airfoil 18 to facilitate the cutting process.

The split inner band 12 may be achieved by any suitable technique such as by wire EDM or carbon electrode cutting. If the split line 32 is cut at an angle and/or if sufficiently thin, flow leakage through the inner band 12 in a radial direction will be insignificant. Preferably, however, side notches or grooves 34 may be cut in the facing inner band edges that define the split line, and a flexible seal, such as a flexible woven metal cloth 36, may be inserted within the aligned grooves 34 to provide a more substantial seal against leakage. Other seals, such as sheet metal seals, may be employed, with the seals tack-welded in place in a location such that the pressures within the engine will provide sufficient sealing without binding along the split line.

Figure 3:
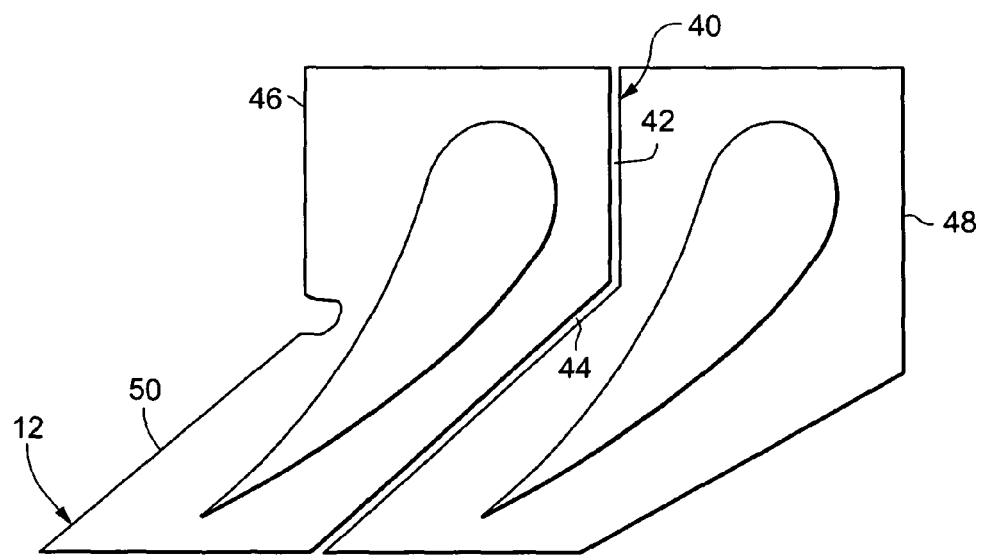
FIG. 3 is a schematic bottom plan view of a variation of the doublet shown in FIG. 2.

FIG. 3 illustrates an alternative path or shape for the inner band split line. In this instance, the split line 40 is composed of two straight-line segments 42, 44 with segment 42 substantially parallel to the side edges 46, 48 of the inner band or sidewall 12, and segment 44 substantially parallel to one of the angled side edges 50 of the inner band 12. Otherwise, the nozzle doublet illustrated in FIG. 3 is substantially identical to that shown in FIGS. 1 and 2. It will be appreciated that, in this split line arrangement, the seal 36 may be composed of two discrete seal strips, inserted from opposite ends of the split line. The seal strips would then meet at the intersection of the segments 42, 44.

Figure 4:
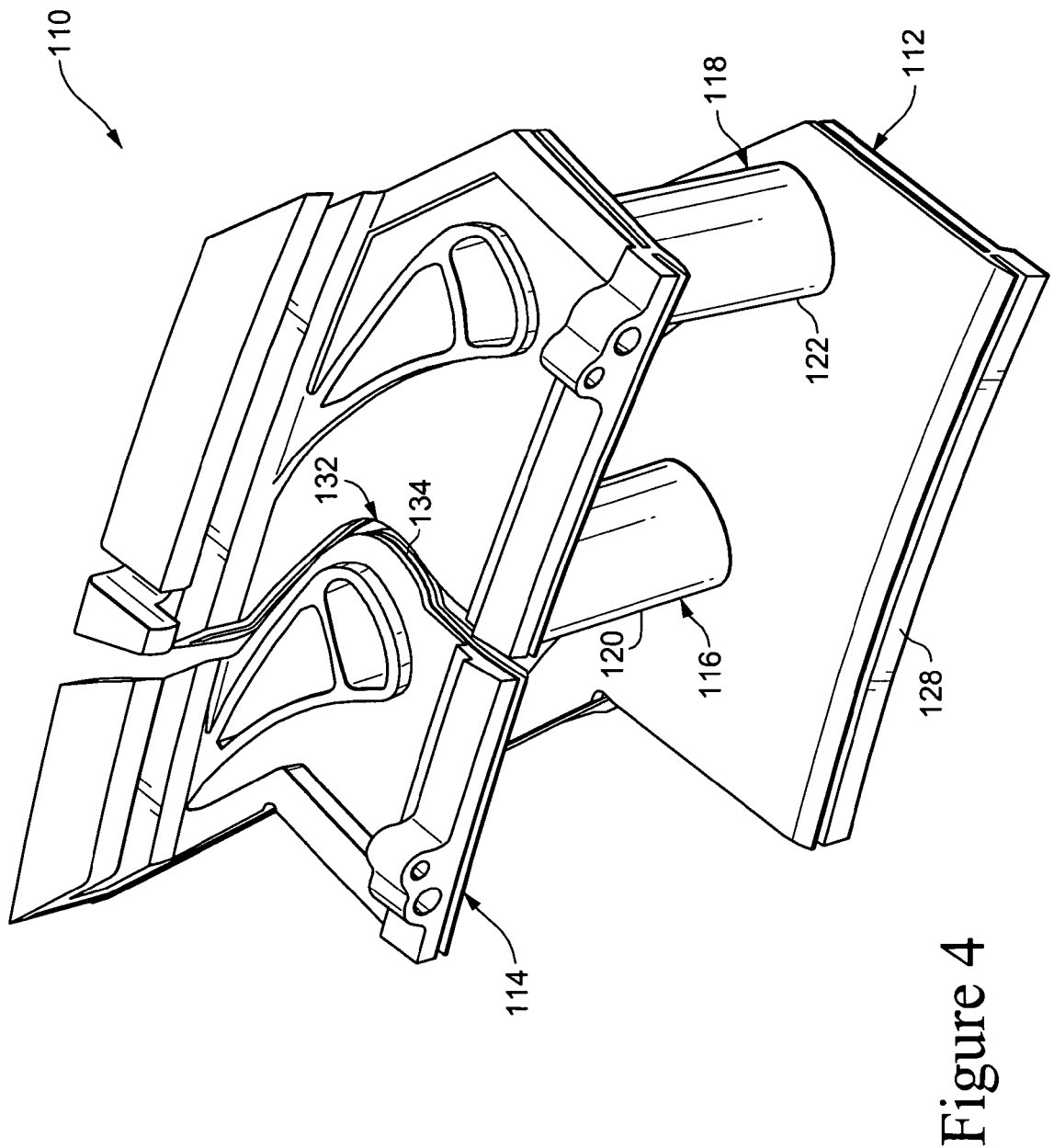
FIG. 4 is a perspective view of a turbine nozzle doublet in accordance with another exemplary but nonlimiting embodiment of the invention.
Figure 5:
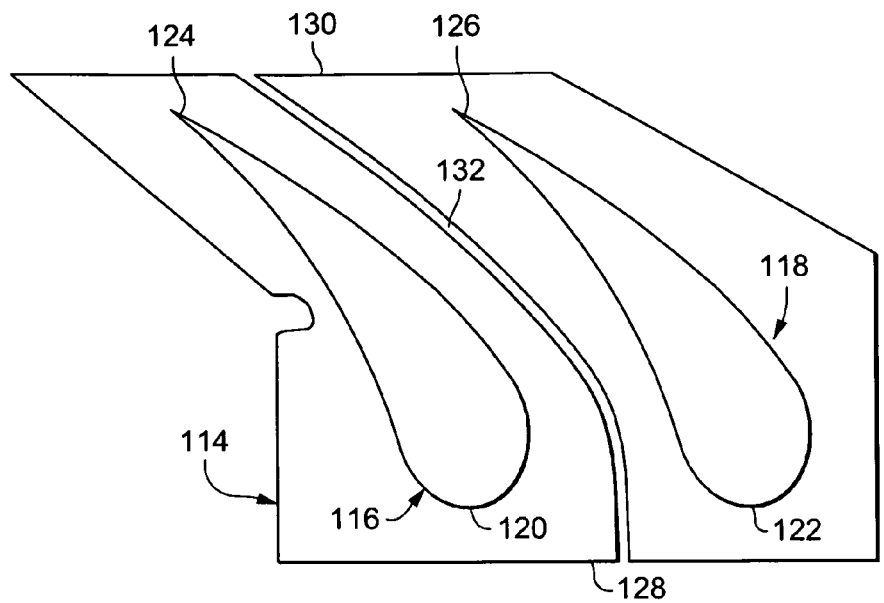
FIG. 5 is a schematic top plan view of the doublet shown in FIG. 4.

FIGS. 4 and 5 illustrate an alternative nozzle vane doublet configuration where the outer band of the doublet is split. For purposes of this disclosure, the doublet may be considered otherwise identical to the doublet 10 and, for convenience, similar reference numerals are used to designate corresponding elements, surfaces and the like, but with the prefix "1" added. Accordingly, the doublet vane 110 includes a radially inner band or sidewall 112 and a radially outer band or sidewall 114.

In this exemplary embodiment, a pair of airfoils 116, 118 extend radially between the inner and outer bands 112, 114. The airfoils have respective leading edges 120, 122 and respective trailing edges 124, 126 (FIG. 5). As oriented in FIG. 4, the nozzle doublet inner band 112 may be considered to have a forward or leading end 128 and an aft or trailing end 130, and here again, the flow of air is in a direction from end 128 to end 130. In this exemplary embodiment, a split line 132 is formed in the outer band 114, progressing from the leading end 128 to the trailing end 130 between the airfoils 116 and 118. In the preferred arrangement, split line 132 follows substantially the curvature of the split line in FIGS. 1 and 2.

The side edges of the split line 132 may also be notched or grooved to receive a seal 36 as in the previously described embodiment.

Figure 6:
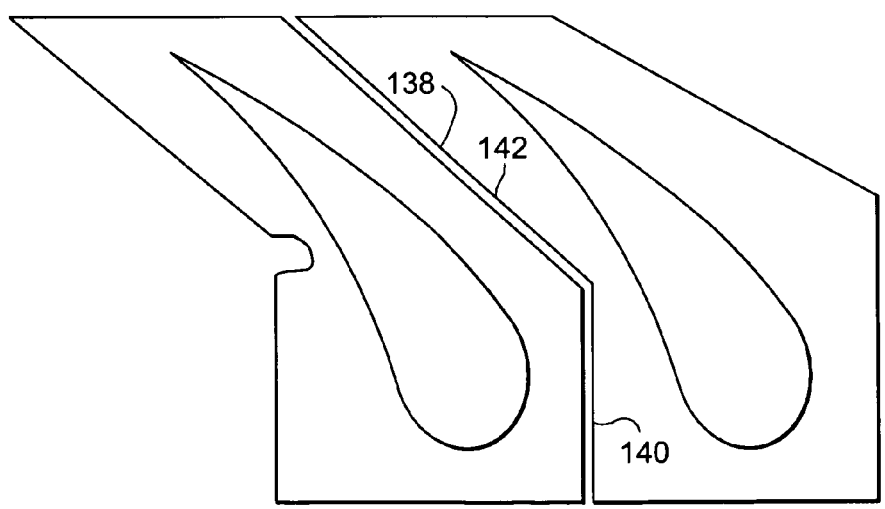
FIG. 6 is a schematic top plan view of a variation of the doublet shown in FIG. 5.

FIG. 6 illustrates a variation where the split line 138 is composed of two straight-line segments 140, 142 and, here again, the seal (not shown in FIG. 6) may be composed of discrete segments that engage at the juncture of seal line segments 140, 142.

To further reduce thermally-induced stresses in the airfoils, the pressure side of the airfoils may be coated with a conventional thermal barrier coating. This is especially useful on the right hand airfoil 18 (or 118) since the stresses are greater on the right side of each doublet. By coating the high temperature side of the airfoil, it is cooled and there is thus less tendency to grow thermally. It is also advantageous to cool the airfoils 16, 18, 116 or 118 more efficiently by, for example, adding cooling apertures 52 along the trailing edge of one or both airfoils, and adding film cooling holes 54 upstream of the trailing edge holes (visible only in FIG. 1). It will be appreciated that the aperture and hole locations may vary as needed to optimize results. Such cooling reduces the temperature difference between the airfoils and the inner and outer bands or sidewalls. Of course, combinations of coatings and cooling apertures along with the split lines may be used to enhance stress reduction and thus reduce or at least delay the onset of cracking.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vane doublet for a turbine nozzle comprising:
a radially inner band, a radially outer band, and
a pair of airfoils extending between said inner band and said outer band, wherein one of said inner and outer bands is common to said pair of airfoils and the other of said inner and outer bands is split in a generally axial direction, along a split line passing between said pair of airfoils; and wherein a seal is secured between or adjacent to facing edges of said split line.

2. The vane doublet of claim 1 wherein said split line is formed in said radially inner band.

3. The vane doublet of claim 1 wherein said seal extends from a leading end of said radially inner or outer band to a trailing end of said radially inner or outer band.

4. The vane doublet of claim 2 wherein said seal extends from a leading end of said radially inner band to a trailing end of said radially inner band.

5. The vane doublet of claim 1 wherein said seal comprises a flexible woven metal seal or sheet metal seal securely attached along the split line.

6. The vane doublet of claim I wherein a pressure side of one of said airfoils is coated with a thermal barrier coating.

7. The vane doublet of claim 4 wherein a pressure side of one of said airfoils is coated with a thermal barrier coating.

8. The vane doublet of claim 6 wherein, in a direction from front to aft, a right hand one of the pair of airfoils is coated on its pressure side with a thermal barrier coating.

9. The vane doublet of claim 1 wherein said split line is formed in said radially outer band.

10. The vane doublet of claim 3 wherein said flexible seal comprises a pair of discrete seal segments.

11. The vane doublet of claim 1 wherein said split line is continuously curved.

12. The vane doublet of claim 1 wherein said split line is composed of a pair of straight-line segments.

13. The vane doublet of claim 1 wherein plural cooling holes are provided in one or both airfoils.

14. The vane doublet of claim 7 wherein plural cooling holes are provided in one or both airfoils.

\* \* \* \* \*